(No Model.)  2 Sheets—Sheet 1.
R. A. DENISON.
ELECTRICAL SUBWAY.
No. 355,867. Patented Jan. 11, 1887.
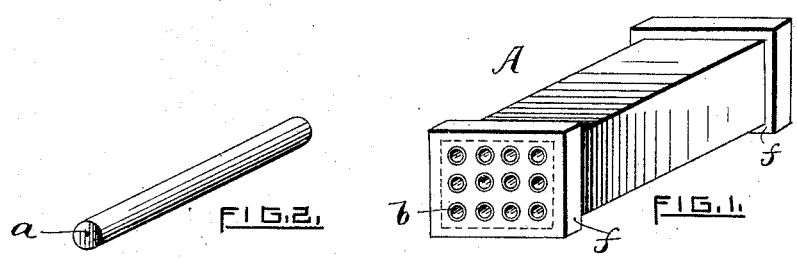
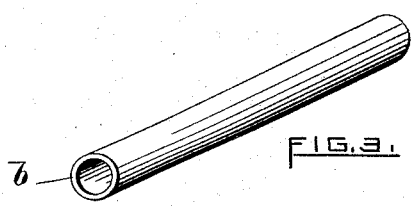
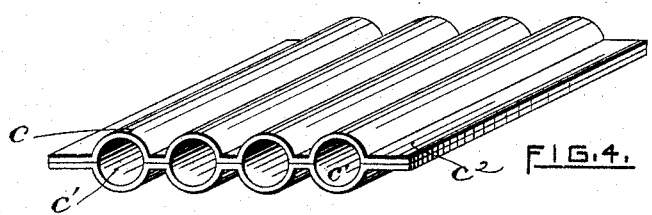
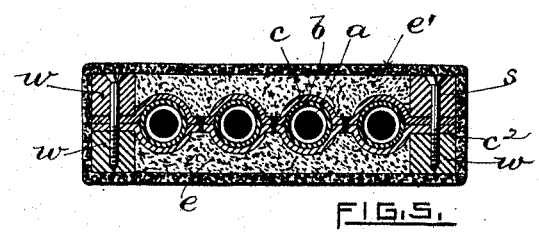
WITNESSES,  
Charles Hannigan  
Joseph Sanford
INVENTOR,  
Russel A. Denison  
by Remington Henthorn  
Attys.

(No Model.) 2 Sheets—Sheet 2.
R. A. DENISON.
ELECTRICAL SUBWAY.
No. 355,867. Patented Jan. 11, 1887.
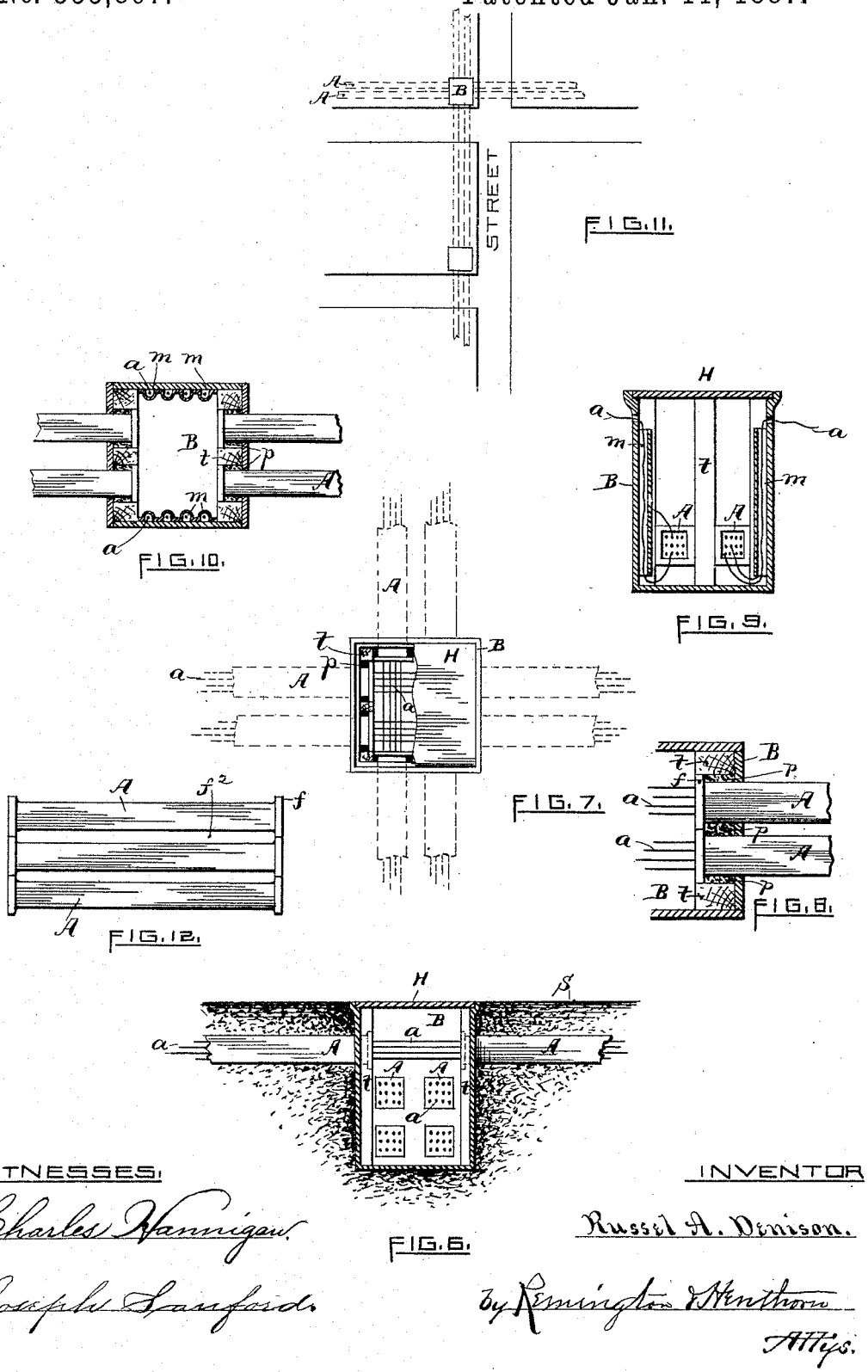

UNITED STATES PATENT OFFICE.

RUSSEL A. DENISON, OF PROVIDENCE, RHODE ISLAND.

ELECTRICAL SUBWAY.

SPECIFICATION forming part of Letters Patent No. 355,867, dated January 11, 1887.

Application filed September 2, 1886. Serial No. 212,452. (No model.)

*To all whom it may concern:*

Be it known that I, RUSSEL A. DENISON, a citizen of the United States, residing at Providence, in the county of Providence and State of Rhode Island, have invented certain new and useful Improvements in Electrical Subways; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention herewith relates to certain novel improvements in the construction of electrical subways; and it consists, essentially, of two closely-cemented corrugated strips of insulating armor composed of asbestus, asphalt, and powdered mica and glass, in combination with an asbestus tube or lining secured within each of said insulated corrugations to produce a non-combustible, insulated, and impervious conduit for electric conducting wires or cables.

It also consists in the combination, with said corrugated armor and asbestus lining, of a concrete conduit composed of ground bituminous rock, asphalt, and mica inclosing the corrugated armor.

It consists, finally, in the combination, with two or more of said conduits, of a man-hole or header adapted to receive and retain the ends of the conduits, insulated corrugated linings forming the sides of the man-hole, and a removably-secured cover, all as will be more fully hereinafter set forth and claimed.

The object of my present invention is to produce a more serviceable conduit or subway for electric conducting-wires, said conduit possessing unusual insulating and non-conducting qualities, and at the same time being practically indestructible from the action of the earth, &c., surrounding it, and from the action of the several electric currents flowing within.

In the accompanying two sheets of drawings which I have prepared to illustrate my invention, Figure 1, Sheet 1, represents a detached perspective view of the conduit as arranged for carrying twelve wires or cables. Fig. 2 is a perspective view of an ordinary conducting-wire adapted to be used in said conduit. Fig. 3 is a perspective view of the asbestus tube or lining. Fig. 4 is a perspective view of the two corrugated strips cemented together, said strips being composed of asbestus, asphalt, and ground mica and glass, substantially as claimed in my United States Patent No. 334,850, of January 26, 1886, the same serving as a shield for the asbestus tube when combined therewith. Fig. 5 is a cross-sectional view of the conduit complete as arranged for four conducting wires or cables. Fig. 6, Sheet 2, is a reduced vertical sectional view, showing the conduits in place and connected with a man-hole or header—as at the intersection of two streets. Fig. 7 is a plan view of the same, the cover being partly broken away. Fig. 8 is an enlarged partial horizontal sectional view taken through the man-hole. Fig. 9 is a vertical sectional view of the man-hole detached, and provided with a corrugated side lining up through which the service-wires are adapted to extend. Fig. 10 is a horizontal sectional view of the same. Fig. 11 is a reduced view showing the relative arrangement of the conduits and streets; and Fig. 12 represents a side view of three conduits resting on each other, and having a space between them for filling in with concrete, &c.

The following is a more detailed description of the invention:

A, referring to the drawings, designates the conduit as a whole.

$c$ indicates the shield or armor, composed of asbestus, asphalt, ground mica, and glass, said shield being formed into corrugated strips, $c'$ indicating the corrugations.

$b$ indicates the non-combustible lining-tube, made of asbestus paper or felting.

In uniting the parts $b$ and $c$ together the surface of the tubes is covered with cement, and two of the strips $c$ then clamped over them, and all cemented together, the whole forming a non-conducting armor having an asbestus lining.

Now, in order to make the conduit as represented in Fig. 5, strips of wood, $w$, are secured at intervals by screws to each side of the flat web $c^2$ of the armor $c$, and the entire intervening space filled in with a concrete composition, $e$, composed of ground bituminous rock, asphalt, and mica, said composition being then in a plastic state. After this has been applied an exterior coating, $e'$, composed of the compound $e$, with the addition of cowdie-gum for hardening, is also applied, thereby completing the single-row conduit. (Shown in said Fig. 5.)

The conduit A, Fig. 1, is composed of a series of three four-chamber conduits, just described, the ends $f$ thereof being enlarged, so that when laid a space, $f^2$, is formed, as shown in Fig. 12.

Referring, now, more particularly to Sheet 2 of the drawings, B indicates the man-hole or header, into which the conduits A are secured by wooden strips $t$ and filling-in concrete $p$, the object being to make water-tight joints. The header B may be made of metal, wood, or artificial composition, its base forming no part of the present claims, the depth being sufficient to extend below the line of frost. H indicates a cover, which may be secured to the top of the header in any well-known manner to produce a water-tight joint.

As represented in the drawings, (see Fig. 6, &c.,) the several entering conduits may carry a number of systems—as, for example, wires for electric lighting purposes and telegraphic and telephonic uses. It is obvious that the opening $c'$ of the armor $c$ may be enlarged to receive telephone-wires "bunched" in the form of a cable. The headers B are also adapted to serve as a chamber in which the workmen stand while "drawing in" the wires or making service-connections.

In Figs. 9 and 10 two of the vertical sides of the header B are provided with the corrugated insulating-shield $m$, the same being substantially like the corrugated armor $c$, before described. By means of this device or arrangement the service-wires $a$ are adapted to be inserted through or below the shield, $m$, and extending upwardly are then passed through the sides of the header, from which the wires are conducted to and connected with a telephone or fire-alarm sub-station, as the case may be, to complete the circuit.

The present invention or electrical subway is preferably adapted to be laid along the outer edge of the sidewalk, below the curbing. The abutting joints of the conduits A, intermediate of the man-holes, may be made up by cementing, &c. A novel joint for this purpose, however, will form the subject of a separate application for Letters Patent to be hereafter filed by me.

The present construction of the conduits of course contemplates the drawing-in of the several conducting wires or cables, each length or section of the subway being about twelve feet.

By means of the superior insulation obtained by the use of my improved conduit the line-wires $a$ may be naked or uninsulated.

In lieu of the ground mica and glass I may use sharp sand, although I deem the latter inferior, in some respects, for the purpose.

I am of course aware that concrete and other conduits, for the purposes hereinbefore named, have been patented prior to my present invention; therefore I do not broadly claim such electrical subway.

What I do claim, and desire to secure by United States Letters Patent, is—

1. The corrugated shield or armor hereinbefore described, composed of asbestos, asphalt, powdered glass, and mica, and having the asbestos lining for each chamber or corrugation, substantially as and for the purpose set forth.

2. The electrical subway or conduit hereinbefore described, consisting of the asbestos-lined corrugated shield $b\ c$, having longitudinal ribs $w$ secured thereto, and the concrete material composed of ground bituminous rock, asphalt, and mica, into which said shield is embedded, substantially as shown and set forth.

3. The subway or conduit hereinbefore described, consisting of a series of asbestos-lined corrugated shields, a series of longitudinal ribs secured thereto, and the concrete filling composed of bituminous rock, asphalt, and mica completely embedding and surrounding the four sides of the same, substantially as shown and set forth.

4. The subway or conduit A, consisting of a series of asbestos-lined corrugated shields, $b\ c$, a series of ribs, $w$, secured thereto, the filling-in concrete $e$, the external coating, $e'$, composed of bituminous rock, asphalt, mica, and cowdie-gum, all constructed and arranged substantially as shown and described, and for the purpose hereinbefore set forth.

5. The combination, with a series of conduits, A, constructed substantially as hereinbefore described and shown, of the insulated man-hole B, adapted to receive the said conduits, and means, substantially as described, for retaining them in a water-tight position.

6. The combination, with the man-hole B, having conduits A secured thereto, of the insulated corrugated lining $m$, secured to the inside of the man-hole, substantially as shown and described, and for the purpose hereinbefore set forth.

In testimony whereof I have affixed my signature in presence of two witnesses.

RUSSEL A. DENISON.

Witnesses:
GEO. H. REMINGTON,
WM. R. DUTEMPLE.